United States Patent
Suzuki et al.

(12)

(10) Patent No.: US 6,355,694 B1
(45) Date of Patent: Mar. 12, 2002

(54) MODIFIED STANNIC OXIDE—ZIRCONIUM OXIDE COMPLEX SOL AND PREPARATION METHOD THEREOF

(75) Inventors: Keitaro Suzuki, Sodegaura; Yoshinari Koyama; Motoko Iijima, both of Funabashi, all of (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/534,528

(22) Filed: Mar. 27, 2000

(30) Foreign Application Priority Data

Mar. 30, 1999 (JP) ............................... 11-088463

(51) Int. Cl.$^7$ ............................... B01F 3/12; C09D 1/00
(52) U.S. Cl. ............................... 516/90; 516/88; 516/33; 106/286.4; 428/412; 423/DIG. 14
(58) Field of Search ............................... 516/90, 33, 88; 427/162; 428/412; 423/DIG. 14; 106/286.4

(56) References Cited

U.S. PATENT DOCUMENTS

| 4,374,158 A | 2/1983 | Taniguchi et al. ............ 427/41 |
| 5,094,691 A | 3/1992 | Watanabe et al. ........ 106/286.4 |
| 5,366,545 A | * 11/1994 | Yajima et al. ............ 106/286.4 |
| 5,460,738 A | 10/1995 | Watanabe et al. ............. 516/90 |
| 5,472,797 A | * 12/1995 | Yajima et al. ............... 428/688 |

FOREIGN PATENT DOCUMENTS

| JP | 50-40119 | 12/1975 |
| JP | A 54-52686 | 4/1979 |
| JP | B2 63-37142 | 7/1988 |
| JP | A 3-217230 | 9/1991 |
| JP | A 6-24746 | 2/1994 |
| JP | 2000-7340 | 1/2000 |
| JP | 200-63754 | 2/2000 |
| JP | 2000-63119 | 2/2000 |

OTHER PUBLICATIONS

Database WPI on East, week 200032 London: Derwent Publications, Ltd, AN 2000–251744, Class A32, JP 2000–063754A (Nissan Chem Ind) abstract, 2000.*

* cited by examiner

Primary Examiner—Daniel S. Metzmaier
(74) Attorney, Agent, or Firm—Oliff & Berridge, PLC

(57) ABSTRACT

The present invention provides a novel modified stannic oxide—zirconium oxide complex sol and a preparation method thereof, particularly a stable sol which contains 2–50% by weight of total metal oxides comprising modified colloidal particles of a stannic oxide—zirconium oxide complex having a particle diameter having 4.5–60 nm, wherein the particles are formed by coating complex colloidal particles of a stannic oxide—zirconium oxide having a bonded structure of stannic oxide colloidal particles and zirconium oxide colloidal particles at a $ZrO_2/SnO_2$ ratio of 0.02–1.0 based on weights of these oxides and having a particle diameter of 4–50 nm as nuclei, with colloidal particles of a tungsten oxide—stannic oxide—silicon dioxide complex having such a constitution that a $WO_3/SnO_2$ weight ratio is 0.1–100, that a $SiO_2/SnO_2$ weight ratio is 0.1–100 and having a particle diameter of 2–7 nm, and preparation method thereof.

2 Claims, No Drawings

MODIFIED STANNIC OXIDE— ZIRCONIUM OXIDE COMPLEX SOL AND PREPARATION METHOD THEREOF

BACKGROUND OF THE INVENTION

1. Field of the Invention

The present invention relates to a sol of modified stannic oxide—zirconium oxide colloidal particles having a particle diameter of 4.5–60 nm which is formed by coating stannic oxide—zirconium oxide complex colloidal particles at their surfaces with colloidal particles of a tungsten oxide—stannic oxide—silicon dioxide complex having a particle diameter of 2–7 nm, and also to a preparation method thereof.

The sol according to the present invention is used as a component for a hard coating agent applied on a plastic lens surface and also for other various applications.

2. Description of the Related Art

A variety of metal oxide sols are already known.

There have been used sols of metal oxides having a high refractive index as a component of a hard coating agent applied on a plastic lens surface which is recently used much in order to improve the surface.

For example, a hard coating agent containing particles of metal oxides such as Al, Ti, Zr, Sn and Sb having a size of 1–300 nm is described in Japanese Patent Publication No. Sho 63-37142.

Although a stable sol of tungsten oxide alone is not known yet, Japanese Patent Application Laid-Open No. Sho 54-52686 proposes a sol obtained by addition of silicate in which a $WO_3:SiO_2:M_2O$ molar ratio (wherein, M represents alkali metal atom or ammonium group) is 4–15:2–5:1.

A silicate—stannate complex sol in which a molar ratio of Si:Sn is 2–1000:1 has been proposed in Japanese Patent Publication No. Sho 50-40119.

Further, Japanese Patent Application Laid-Open No. Hei 3-217230 proposes a stable sol comprising a modified metal oxide colloid having a particle diameter of 4.5–60 nm and which is formed by coating colloidal particulate surfaces of metal oxide having a particle diameter of 4–50 nm and a valence of 3, 4 or 5 as nuclei with colloidal particles of a tungsten oxide—stannic oxide complex having a $WO_3/SnO_2$ weight ratio of 0.5–100 and a particle diameter of 2–7 nm, the stable sol containing 2–50% by weight of total metal oxides.

Further, Japanese Patent Application Laid-Open No. Hei 6-24746 proposes a stable sol of a modified $SnO_2$-$ZrO_2$ complex which comprises particles formed by coating colloidal particle surfaces of metal oxide having a $ZrO_2/SnO_2$ weight ratio of 0.02–1.0 and a particle diameter of 4–50 nm as nuclei with colloidal particles of a $WO_3$-$SnO_2$ complex having a $WO_3/SnO_2$ weight ratio of 0.5–100 and a particle diameter of 2–7 nm.

However, if these conventional metal oxide sols, particularly cationic metal oxide sols, are used as a component of a hard coating agent, the stability of the obtained hard coating agent is insufficient and also transparency, adhesion, weather resistance, etc. of a hardened coating coated with the hard coating agent are insufficient. Further, if an $Sb_2O_5$ sol is used as a component of a hard coating agent, the $Sb_2O_5$ sol can no longer improve a refractive index of the hardened coating sufficiently when a refractive index of a plastic substrate in a lens is 1.6 or more, since a refractive index of $Sb_2O_5$ is about 1.65–1.70.

A sol of tungsten oxide described in the above-mentioned Japanese Patent Application Laid-Open No. Sho 54-52686 is obtained by adding a silicate to an aqueous tungstate solution which is obtained by decationizing an aqueous tungstate solution, but it is stable only at a strong acidic state and an effect for improving a refractive index of a coating is low in the case of use as a component of a hard coating agent.

A silicate—stannate complex sol described in the above-mentioned Japanese Patent Publication No. Sho 50-40119 is obtained by decationizing a mixed aqueous solution of an alkali silicate and an alkali stannate, but an effect for improving a refractive index of a coating is also low in the case of use as a component of a hard coating agent as described above.

A modified metal oxide sol described in the above-mentioned Japanese Patent Application Laid-Open No. Hei 3-217230 having a refractive index of 1.7 or more is stable, thus it can be used as a component of a hard coating agent for a plastic lens and it can satisfy almost all properties required for a hard coating such as damage resistance, transparency, adhesion, water resistance, weather resistance, etc.

A modified stannic oxide—zirconium oxide sol described in the above-mentioned Japanese Patent Application Laid-Open No. Hei 6-24746 having a refractive index of 1.7 or more is stable, thus it can be used as a component of a hard coating agent for a plastic lens, and it can satisfy almost all properties required for a hard coating such as damage resistance, transparency, adhesion, etc.

SUMMARY OF THE INVENTION

A modified metal oxide sol according to the present invention provides a stable sol of modified stannic oxide—zirconium oxide complex colloidal particles having good water resistance, moisture resistance, weather resistance and a high refractive index which overcomes yellowing due to ultraviolet radiation found when the conventional metal oxide sols are used and also overcomes such problems as water resistance and moisture resistance, and thus it provides a metal oxide sol which can be used by mixing with a hard coating paint as a component for improving properties of the hard coating applied on a plastic lens surface.

The present invention provides a stable sol which comprises modified colloidal particles of stannic oxide—zirconium oxide complex having a particle diameter of 4.5–60 nm, wherein the particles are formed by coating complex colloidal particles of a stannic oxide—zirconium oxide having a bonded structure of stannic oxide colloidal particles and zirconium oxide colloidal particles at a $ZrO_2/SnO_2$ ratio of 0.02–1.0 based on weights of these oxides and having a particle diameter of 4–50 nm as nuclei, with colloidal particles of a tungsten oxide—stannic oxide—silicon dioxide complex having such a constitution that a $WO_3/SnO_2$ weight ratio is 0.1–100, that a $SiO_2/SnO_2$ weight ratio is 0.1–100 and having a particle diameter of 2–7 nm, and which contains 2–50% by weight of total metal oxides.

Further, a method for preparing a stable sol according to the present invention comprises the steps of:

a step (a) of mixing an aqueous stannic oxide sol which contains colloidal particles of stannic oxide having a particle diameter of 4–50 nm at a concentration of 0.5–50% by weight as its oxide, $SnO_2$, with an aqueous oxyzirconium salt solution having a concentration of 0.5–50% by weight calculated as $ZrO_2$, at a $ZrO_2/SnO_2$ weight ratio of 0.02–1.0;

a step (b) of forming an aqueous stannic oxide—zirconium oxide complex sol having a particle diameter of 4–50 nm by heating the mixed solution obtained in the step (a) at 60–200° C. for 0.1–50 hours;

a step (c) of forming a sol of a tungsten oxide—stannic oxide—silicon dioxide complex by preparing an aqueous solution containing tungstate, stannate and silicate at a $WO_3/SnO_2$ weight ratio of 0.1–100 and a $SiO_2/SnO_2$ weight ratio of 0.1–100 and removing cations present in the solution;

a step (d) of mixing 100 parts by weight, calculated as the total of $ZrO_2$ and $SnO_2$ contained, of the aqueous stannic oxide—zirconium oxide complex sol obtained in the step (b) with 2–100 parts by weight, calculated as total of $WO_3$, $SnO_2$ and $SiO_2$ contained, of the tungsten oxide—stannic oxide—silicon dioxide complex sol obtained in the step (c) having a particle diameter of 2–7 nm, a $WO_3/SnO_2$ weight ratio of 0.1–100 and a $SiO_2/SnO_2$ weight ratio of 0.1–100 at 0–100° C.; and a step (e) of removing anions present in the aqueous modified stannic oxide—zirconium oxide complex sol obtained in the step (d) by bringing the sol into contact with an anion exchanger.

DETAILED DESCRIPTION OF THE PREFERRED EMBODIMENTS

The sol of stannic oxide—zirconium oxide complex colloidal particles to be used as nuclear particles in the preparation of the sol according to the present invention can be prepared by the method comprising the above-mentioned steps (a) and (b). Stannic oxide colloidal particles to be used in the step (a) can be made easily in a sol form of colloidal particles having a particle diameter of about 4–50 nm by known methods such as an ion exchange method, a peptization method, a hydrolysis method and a reaction method.

As examples of the above-mentioned ion exchange method, there may be mentioned a method of treating stannate such as sodium stannate with a hydrogen type cation exchange resin, and a method of treating stannate such as the above-mentioned stannic chloride and stannic nitrate with a hydroxide type anion exchange resin. As examples of the above-mentioned peptization method, there may be mentioned a method of neutralizing a stannate with a base, or a method of washing a stannic hydroxide gel obtained by neutralizing stannate with hydrochloric acid, and thereafter peptizing it with an acid or a base. As examples of the above-mentioned hydrolysis method, there may be mentioned a method of hydrolyzing tin alkoxide or of hydrolyzing basic stannic chloride, a basic salt, by heating and thereafter removing an unnecessary acid. As an example of the above-mentioned reaction method, there may be mentioned a method of reacting metallic tin powders with an acid.

A medium for the stannic oxide sol may be water or any hydrophilic organic solvent, but an aqueous sol is preferable in which a solvent is water. Further, pH of the sol may be such a value to make the sol stable, generally about 0.2–11. So long as an object of the present invention is attained, optional components such as alkaline substances, acidic substances and oxycarboxylic acids may be introduced in the stannic oxide sol for stabilization of the sol. A concentration of the stannic oxide sol used may be about 0.5–50% by weight of stannic oxide, but the concentration is preferably lower, more preferably 1–30% by weight.

The stannic oxide—zirconium oxide complex sol can be obtained by the step (a) in which the above-mentioned stannic oxide sol is mixed with an oxyzirconium salt at a $ZrO_2/SnO_2$ weight ratio of 0.02–1.0 at 0–100° C. for 0.5–3 hours and the step (b) in which it is heated at 60–200° C. for 0.1–50 hours.

As the oxyzirconium salts to be used, there may be mentioned zirconium oxychloride, zirconium oxynitrate, zirconium oxysulfate, oxyzirconium salts of organic acids such as zirconium oxyacetate, and zirconium oxycarbonate. These oxyzirconium salts may be used as solids or aqueous solutions, and they may be used as aqueous solutions containing 0.5–50% by weight, preferably 0.5–30% by weight, of $ZrO_2$. Water-insoluble salts such as zirconium oxycarbonate can be used such a case that stannic oxide to be mixed is an acidic sol.

It is preferable to use the stannic oxide sol as an alkaline sol stabilized particularly with an organic base such as amine, and the mixing with oxyzirconium salt is carried out preferably at 0–100° C., preferably from room temperature to 60° C. And, the mixing may be carried out by adding the oxyzirconium salt to the stannic oxide sol with stirring or by adding the stannic oxide sol to the aqueous solution of the oxyzirconium salt with stirring, wherein the latter is more preferable. It is necessary to carry out the mixing sufficiently, and the mixing period is preferably 0.5–3 hours.

$WO_3$, $SnO_2$ and $SiO_2$ complex colloidal particles contained in the tungsten oxide—stannic oxide—silicon dioxide complex sol obtained in the step (c) which is used as a coating sol according to the present invention can be observed as to a particle diameter by means of an electron microscope, and the particle diameter is 1–50 nm, preferably 2–7 nm, more preferably 2–5 nm. As a dispersing medium for the sol colloidal particles, water or any hydrophilic organic solvent may be used. The sol contains $WO_3$, $SnO_2$ and $SiO_2$ at a $WO_3/SnO_2$ weight ratio of 0.1–100 and a $SiO_2/SnO_2$ weight ratio of 0.1–100. A total concentration of $WO_3$, $SnO_2$ and $SiO_2$ contained in the sol is generally 40% by weight or lower, in practice preferably 2% by weight or greater, preferably 5–30% by weight. The sol exhibits pH of 1–9 and it is a colorless and transparent or slightly colloidal colored solution. And, it is stable for more than 3 months at room temperature, and more than 1 month even at 60° C. without any precipitation in the sol, and further a viscosity of the sol is not increased nor gelation is occurred.

A method for preparing a stable tungsten oxide—stannic oxide—silicon dioxide complex sol characterized in that complex colloidal particles of tungsten oxide ($WO_3$), stannic oxide ($SnO_2$) and silicon dioxide ($SiO_2$) obtained in the step (c) are contained comprises the steps of:

(c-1) preparing an aqueous solution containing tungstate, stannate and silicate at a $WO_3/SnO_2$ weight ratio of 0.1–100 and a $SiO_2/SnO_2$ weight ratio of 0.1–100; and (c-2) removing cations present in the aqueous solution obtained in the step (c-1).

As examples of tungstates, stannates and silicates to be used in the step (c-1), there may be mentioned tungstates, stannates and silicates of alkali metals, ammonium, amines, etc. As preferable examples of these alkali metals, ammonium and amines, there may be mentioned those of Li, Na, K, Rb, Cs, $NH_4$, alkyl amines such as ethylamine, triethylamine, isopropylamine, n-propylamine, isobutylamine, diisobutylamine and di (2-ethylhexyl) amine; aralkyl amines such as benzylamine; alicyclic amines such as piperidine; and alkanol amines such as monoethanolamine and triethanolamine. Particularly, sodium tungstate ($Na_2WO_4 \cdot 2H_2O$), sodium stannate ($Na_2SnO_3 \cdot 3H_2O$) and sodium silicate (water glass) are preferable. Further, those obtained after dissolving tungsten oxide, tungstic acid, stannic acid, silicate, etc. into an aqueous solution of alkali metal hydroxide may be used. Further, amine silicates and quaternary ammonium silicates obtained by adding alkyl amines such as ethylamine, triethylamine, isopropylamine, n-propylamine, isobutylamine, diisobutylamine and di(2-ethylhexyl)amine to active silicic acid as silicate may be used.

As the methods for preparing the aqueous solution in the step (c-1), there may be mentioned a method of preparing the aqueous solution by dissolving respective powders of tungstate, stannate or silicate into water, a method of preparing the aqueous solution by mixing an aqueous tungstate solution, an aqueous stannate solution and aqueous silicate solution, and a method of preparing the aqueous solution by adding powders of tungstate and stannate as well as an aqueous solution of silicate into water.

The aqueous solution of tungstate to be used for the sol preparation in the step (c) has preferably a $WO_3$ concentration of about 0.1–15% by weight, but higher concentrations may be used.

The aqueous solution of stannate to be used in the preparation of the sol in the step (c) has preferably a $SnO_2$ concentration of about 0.1–30% by weight, but higher concentrations may be used.

The aqueous solution of silicate to be used in the preparation of the sol according to the present invention has preferably a $SiO_2$ concentration of about 0.1–30% by weight, but higher concentrations may be used.

The preparation of the aqueous solution in the step (c-1) may be carried out at from room temperature to 100° C., preferably from room temperature to 60° C. The aqueous solution to be mixed has preferably a $WO_3/SnO_2$ weight ratio of 0.1–100 and a $SiO_2/SnO_2$ weight ratio of 0.1–100.

The step (c-2) is a step to remove cations present in the aqueous solution obtained in the step (c-1). The decationizing treatment may be carried out by bringing it into contact with a hydrogen type ion exchanger or salting-out. The hydrogen type cation exchangers to be used herein may be any ones generally used, and it is convenient to use commercially available hydrogen type cation exchangers.

If the aqueous sol obtained via the steps (c-1) and (c-2) has a low concentration, the aqueous sol maybe concentrated, if desired, by general concentration methods such as an evaporating method and an ultrafiltration method. In particular, the ultrafiltration method is preferable. During concentrating, the temperature of the sol is preferably maintained at about 100° C. or lower, particularly at about 60° C. or lower.

A hydrophilic organic solvent sol referred to an organosol can be obtained by substituting water in the aqueous sol in the step (c) with a hydrophilic organic solvent.

The sol of tungsten oxide—stannic oxide—silicon dioxide complex obtained in the step (c) contains complex particles comprising the tungsten oxide—stannic oxide—silicon dioxide complex obtained by complexing (subjecting to solid solution) tungsten oxide, stannic oxide and silicon dioxide homogenously at atomic levels. Therefore, it is not obtained only by mixing three sols, that is, a tungsten oxide sol, a stannic oxide sol and a silicon dioxide sol.

Since particles of the tungsten oxide—stannic oxide—silicon dioxide complex sol form a solid solution, the tungsten oxide—stannic oxide—silicon dioxide complex sol cannot be decomposed into tungsten oxide particles, stannic oxide particles and silicon dioxide particles by solvent substitution.

The tungsten oxide—stannic oxide—silicon dioxide complex sol has improved water resistance, moisture resistance and weather resistance compared with the tungsten oxide—stannic oxide complex sol when formed into a coating by coating a substrate therewith.

If the $WO_3/SnO_2$ weight ratio of the sol obtained in the step (c) is less than 0.1, the sol becomes unstable, and if the weight ratio is above 100, the sol does not exhibit stability. The oxycarboxylic acid to be added during the preparation of the above-mentioned organosol from the aqueous sol having high pH may contribute to stabilization of the sol, but water resistance of a dried coating obtained by using the sol becomes low if an addition amount thereof is 30% by weight or higher based on the total of $WO_3$, $SnO_2$ and $SiO_2$. As examples of oxycarboxylic acids to be used, there may be mentioned lactic acid, tartaric acid, citric acid, gluconic acid, malic acid, glycolic acid, etc. Further, as alkali components, there may be mentioned, hydroxides of alkali metals such as Li, Na, K, Rb and Cs, $NH_4$, alkyl amines such as ethylamine, triethylamine, isopropylamine and n-propylamine; aralkyl amines such as benzylamine; alicyclic amines such as piperidine; and alkanol amines such as monoethanolamine and triethanolamine. These may be contained by mixing two or more thereof. Further, they may be used together with the above-mentioned acidic components. The pH of the sol varies according to amounts of alkali metal, ammonium, amine, oxycarboxylic acid, etc. in the sol. If the pH of the sol is lower than 1, the sol becomes unstable, and if the pH is above 9, colloidal particles of tungsten oxide, stannic oxide and silicon dioxide complex are easily dissolved in a solution. If the total concentration of $WO_3$, $SnO_2$ and $SiO_2$ is 40% by weight or higher, the sol also becomes less stable. If the concentration is too low, the sol is not practical, and thus the preferable concentration for industrial products is 5–30% by weight.

If the ultrafiltration method is used as a concentrating method, polyanions, quite fine particles and the like co-present in the sol are passed through an ultrafiltration membrane together with water, and thus polyanions, quite fine particles and the like which cause instability of the sol can be removed from the sol.

The step (d) is a step to mix 100 parts by weight, calculated as the total of $ZrO_2$ and $SnO_2$ contained therein, of the aqueous stannic oxide—zirconium oxide complex sol obtained in the step (b) and 2–100 parts by weight, calculated as the total of $WO_3$, $SnO_2$ and $SiO_2$ contained therein, of the aqueous tungsten oxide—stannic oxide—silicon dioxide complex sol having a particle diameter of 2–7 nm, a $WO_3/SnO_2$ weight ratio of 0.1–100 and a $SiO_2/SnO_2$ weight ratio of 0.1–100 obtained in the step (c) at 0–100° C.

In the step (d), colloidal particles of the tungsten oxide—stannic oxide—silicon dioxide complex sol are bonded on a surface of colloidal particles of the stannic oxide—zirconium oxide complex sol and the resultant surface is coated with the above-mentioned colloidal particles of tungsten oxide—stannic oxide—silicon dioxide complex, to generate a modified stannic oxide—zirconium oxide complex colloidal particles which have the colloidal particles as nuclei and which have surface properties of tungsten oxide—stannic oxide—silicon dioxide complex. Further, the sol can be obtained in which the modified stannic oxide—zirconium oxide complex colloidal particles are stably dispersed in the solvent of the solution.

The sol of stannic oxide—zirconium oxide complex colloidal particles modified with tungsten oxide—stannic oxide—silicon dioxide complex colloidal particles is obtained by the step (d) of mixing 100 parts by weight, calculated as metal oxides thereof ($ZrO_2+SnO_2$), of the stannic oxide—zirconium oxide complex sol with 2–100 parts by weight, calculated as total of $WO_3$, $SnO_2$ and $SiO_2$, of the above-mentioned tungsten oxide—stannic oxide—silicon dioxide complex sol preferably with stirring strongly, and then the step (e) of removing anions in the sol from the mixed sol.

The modified stannic oxide—zirconium oxide complex colloidal particles in the sol obtained by the mixing step (d) can be observed by means of an electron microscope, and they have a particle diameter of about 4.5–60 nm. Although the sol obtained by the above-mentioned mixing has pH of about 1–9, it contains a number of anions such as Cl⁻, $NO_3^-$ and $CH_3COO^-$ derived from the oxyzirconium salt used for modification and thus micro-aggregation occurs in colloidal particles to lower transparency of the sol.

A stable sol of modified stannic oxide—zirconium oxide complex colloidal particles having good transparency can be obtained at pH of 3–11 by the step (e) of removing anions in the sol obtained by the above-mentioned mixing step.

Anion removal in the step (e) can be attained by treating the sol obtained by the above-mentioned mixing with a hydroxide group type anion exchange resin at a temperature of 100° C. or lower, preferably from room temperature to about 60° C. As hydroxide type anion exchange resins, there may be used commercially available ones, but strongly basic type ones such as Ameliorate IRA-410 are preferable.

It is particularly preferable that the treatment by means of the hydroxide type anion exchange resin is carried out at a metal oxide concentration of 1–10% by weight in the sol obtained by the mixing step (d).

If the concentration of the modified stannic oxide— zirconium oxide complex obtained in the steps (a)–(e) is desired to be higher, it can be concentrated up to about 50% by weight by general methods such as an evaporation method and an ultrafiltration method. And, if pH of the sol is controlled, it can be carried out by adding the above-mentioned hydroxides such as above-mentioned hydroxides of alkali metals and ammonium, the above-mentioned amines and oxycarboxylic acids to the sol after concentrating. Particularly, the sol in which the total concentration of the above-mentioned metal oxides ($ZrO_2+SnO_2$) and ($WO_3+SnO_2+SiO_2$) is 10–40% by weight is preferably in practice.

Colloidal particles in the modified stannic oxide— zirconium oxide complex sol obtained in the step (e) can be coated on their surfaces partly or totally with silane compounds such as ethyl silicate, methyltrimethoxysilane and γ-glycidoxypropyl-trimethoxysilane or hydrolysates thereof.

When the modified stannic oxide—zirconium oxide complex sol obtained by the above-mentioned mixing step is an aqueous sol, an organosol can be obtained by substituting the water medium of the aqueous sol with a hydrophilic organic solvent. The substitution can be carried out by general methods such as a distillation method and an ultrafiltration method. As examples of the hydrophilic organic solvents, there may be mentioned lower alcohols such as methyl alcohol, ethyl alcohol and isopropyl alcohol; straight-chained amides such as dimethylformamide and N,N'-dimethyl-acetamide; cyclic amides such as N-methyl-2-pyrrolidone; and glycols such as ethyl cellosolve and ethylene glycol.

The above-mentioned substitution of water with the hydrophilic organic solvent can be carried out easily by general methods such as a distilling substitution method and an ultrafiltration method.

Colloidal particles of the modified stannic oxide— zirconium oxide complex sol which are coated on their surfaces with colloidal particles of the tungsten oxide— stannic oxide—silicon dioxide complex are negatively charged in the sol. The above-mentioned colloidal particles of the stannic oxide—zirconium oxide complex are positively charged, and colloidal particles of the tungsten oxide—stannic oxide—silicon dioxide complex are negatively charged. Therefore, it can be considered as follows; colloidal particles of the negatively charged tungsten oxide—stannic oxide—silicon dioxide complex are attracted electrically around colloidal particles of positively charged stannic oxide—zirconium oxide complex by the mixing step (d), and colloidal particles of the tungsten oxide—stannic oxide—silicon dioxide complex are bonded on the surfaces of the positively charged colloidal particles by chemical bonding to coat the positively charged particle surfaces as nuclei with the tungsten oxide—stannic oxide— silicon dioxide complex and to form modified stannic oxide—zirconium oxide complex colloidal particles.

However, when the stannic oxide—zirconium oxide complex colloidal particles having a particle diameter of 4–50 nm as the nuclear sol are mixed with the tungsten oxide— stannic oxide—silicon dioxide complex colloidal particles as the coating sol, the stable sol cannot be obtained if the total amount of metal oxides of the coating sol ($WO_3+SnO_2+SiO_2$) is less than 2 parts by weight per 100 parts by weight of metal oxides of the nuclear sol ($ZrO_2+SnO_2$). It is considered that if the amount of the tungsten oxide—stannic oxide—silicon dioxide complex colloidal particles is insufficient, the coating surfaces of the stannic oxide— zirconium oxide complex colloidal particles as the nuclei become insufficient, thus aggregation of formed colloidal particles occurs easily to make the formed sol unstable. Therefore, the amount of the tungsten oxide—stannic oxide—silicon dioxide complex colloidal particles to be mixed may be less than that coats total surfaces of the stannic oxide—zirconium oxide complex colloidal particles but more than the minimum amount required to form the stable sol of the modified stannic oxide—zirconium oxide complex colloidal particles. When the amount above that used for surface coating of the tungsten oxide—stannic oxide—silicon dioxide complex colloidal particles is used, the obtained sol is formed as only just a stable mixed sol of the tungsten oxide—stannic oxide—silicon dioxide complex colloidal particle sol with the modified stannic oxide— zirconium oxide complex colloidal particle sol.

Preferably, the amount of the tungsten oxide—stannic oxide silicon dioxide complex colloidal particles to be used may be less than 100 parts by weight of the ($WO_3+SnO_2+SiO_2$) per 100 parts by weight of total metal oxides of the nuclear sol ($ZrO_2+SnO_2$) in order to modify stannic oxide— zirconium oxide complex colloidal particles by surface coating.

The preferable aqueous complex sol of the modified stannic oxide—zirconium oxide according to the present invention has pH of 3–11, and such a sol is liable to become unstable if pH is lower than 3. Further, if pH is above 11, the tungsten oxide—stannic oxide—silicon dioxide complex by which the modified stannic oxide—zirconium oxide complex colloidal particles are coated tends to dissolve easily in the solution. Further, if the total concentration of the above-mentioned metal oxides ($ZrO_2+SnO_2$) and ($WO_3+SnO_2+SiO_2$) is above 50% by weight, such a sol tends to become unstable. The preferable concentration for industrial materials is about 10–40% by weight.

Since tungsten oxide—stannic oxide—silicon dioxide complex colloidal particles tend to be hydrolyzed at a high temperature, the temperature of 100° C. or lower is preferable during mixing in the step (d), anion exchange in the step (e) and concentrating, pH adjustment and solvent substitution after the step (e).

EXAMPLES

Preparation of Stannic Oxide Sol 1200 g of a light yellow and transparent aqueous stannic oxide sol having a specific gravity of 1.420, pH of 0.40, a viscosity just after stirring of 32 mPa.s, an $SnO_2$ content of 33.0% by weight, an HCl content of 2.56% by weight, a spindle-form colloidal diameter of 10 nm or less by an electron microscope, a specific surface area of a particle by a BET method of 120 $m^2/g$, a particle diameter, calculated from the specific surface area, of 7.2 nm, a particle diameter by means of an $N_4$ device made from COULTER ELECTRONICS INC., U.S.A. in a dynamic light-scattering method of 107 nm which was obtained by the reaction of metallic tin powders, an aqueous solution of hydrochloric acid and an aqueous solution of hydrogen peroxide was dispersed into 10800 g of water, to which 4.8 g of isopropylamine was added, then the obtained solution was passed through a column filled with a hydroxide group type anion exchange resin, to obtain 13440 g of an alkaline aqueous stannic oxide sol. The sol was stable and colloidal colored, and it was very highly transparent and had a specific gravity of 1.029, pH of 9.80, a viscosity of 1.4 mPa.s, an $SnO_2$ content of 2.95% by weight and an isopropylamine content of 0.036% by weight.

Example 1

Step (a)

To 3043 g of an aqueous zirconium oxychloride solution (containing 60.87 g of $ZrO_2$, 2.0% by weight of $ZrO_2$) prepared by dissolving a reagent, zirconium oxychloride ($ZrOCl_2.8H_2O$), into water, 10791 g of the alkaline aqueous stannic oxide sol as prepared above (409.5 g of $SnO_2$) was added with stirring at room temperature and continued to stir for 2 hours. The mixed solution was a sol having a $ZrO_2/SnO_2$ weight ratio of 0.15, pH of 1.50, colloidal color and good transparency.

Step (b)

The mixed solution prepared in the step (a) was treated by heating at 90° C. for 5 hours with stirring, to obtain 13834 g of a stannic oxide—zirconium oxide complex sol. The sol had 2.96% by weight of $SnO_2$, 0.44% by weight of $ZrO_2$, 3.40% by weight of $SnO_2+ZrO_2$, pH of 1.45, a particle diameter of 9.0 nm, colloidal color and good transparency.

Step (c)

113 g of No. 3 sodium silicate (containing 29.0% by weight of $SiO_2$) was dissolved in 2353.7 g of water, into which 33.3 g of sodium tungstate $Na_2WO_4.2H_2O$ (containing 71% by weight of $WO_3$) and 42.45 g of sodium stannate $NaSnO_3.H_2O$ (containing 55% by weight of $SnO_2$) were then dissolved. Then, the solution was passed through a column of a hydrogen type cation exchange resin, to obtain 3150 g of an acidic tungsten oxide—stannic oxide—silicon dioxide complex sol (pH of 2.1, containing 0.75% by weight of $WO_3$, 0.75% by weight of $SnO_2$ and 1.00% by weight of $SiO_2$, and having a $WO_3/SnO_2$ weight ratio of 1.0, a $SiO_2/SnO_2$ weight ratio of 1.33 and a particle diameter of 2.5 nm).

Step (d)

To 3150 g of the tungsten oxide—stannic oxide—silicon dioxide complex sol (containing 78.83 g of $WO_3+SnO_2+SiO_2$) prepared in the step (c), 11592.6 g (containing 394.1 g of $ZrO_2+SnO_2$) of a stannic oxide—zirconium oxide complex sol was added over 20 minutes and continued to stir for 30 minutes. In the obtained mixed solution, a ratio of tungsten oxide—stannic oxide—silicon dioxide complex colloid ($WO_3+SnO_2+SiO_2$) to stannic oxide—zirconium oxide complex colloid ($ZrO_2+SnO_2$) was a ($WO_3+SnO_2+SiO_2$)/($ZrO_2+SnO_2$) weight ratio of 0.20, pH was 2.26, an amount of the total metal oxides was 3.2% by weight, and the solution exhibited a tendency of cloudiness due to micro-aggregation of colloidal particles.

Step (e)

To 14742.6 g of the mixed solution obtained in the step (d), 9.5 g of diisobutylamine was added and then passed through a column filled with a hydroxide group type anion exchange resin (Ameliorate 410) at room temperature, then heated and aged at 80° C. for 1 hour, to obtain 16288 g of a modified aqueous stannic oxide—zirconium oxide complex sol (diluted solution). The sol had 2.90% by weight of total metal oxides, pH of 10.43, colloidal color and good transparency.

The modified aqueous stannic oxide—zirconium oxide complex sol (diluted solution) obtained in the step (e) was concentrated by means of a filtering device fitted with an ultrafiltration membrane having about 50,000-molecular-weight cutoff at room temperature, to obtain 2182 g of a highly concentrated modified aqueous stannic oxide—zirconium oxide complex sol. The sol had pH of 8.71 and 18.3% by weight of total metal oxides ($ZrO_2+SnO_2+WO_3+SiO_2$), and it was stable.

To 2182 g of the above-mentioned highly concentrated modified aqueous stannic oxide—zirconium oxide complex sol, 4.0 g of tartaric acid, 6.0 g of diisobutylamine and one drop of a defoamer (SN defoamer 483 made by Sannopco Co.) were added with stirring at room temperature and stirred for 1 hour. The sol was distilled off water under the normal pressure by adding 20 liters of methanol little by little in a reaction flask equipped with a stirrer, to obtain 1171 g of a modified methanolic stannic oxide—zirconium oxide complex sol wherein water of the aqueous sol was substituted with methanol. The sol had a specific gravity of 1.124, pH of 7.45 (an equal weight mixture with water), a viscosity of 2.3 mPa.s, 32.7% by weight of total metal oxides ($ZrO_2+SnO_2+WO_3+SiO_2$), a water content of 0.47% by weight and a particle diameter by an electron-microscopic observation of 10–15 nm.

The sol had colloidal color and high transparency, and it was stable after 3 months at room temperature without any abnormality such as formation of precipitation, cloudiness and increase in viscosity. Further, a refractive index of the dried version of sol was 1.76.

Example 2

Step (a)

To 3043 g of an aqueous zirconium oxychloride solution (containing 60.87 g of $ZrO_2$, 2.0% by weight of $ZrO_2$) prepared by dissolving a reagent, zirconium oxychloride ($ZrOCl_2.8H_2O$), into water, 10791 g of the alkaline aqueous stannic oxide sol as prepared above (409.5 g of $SnO_2$) was added with stirring at room temperature and continued to stir for 2 hours. The mixed solution was a sol having a $ZrO_2/SnO_2$ weight ratio of 0.15, pH of 1.50, colloidal color and good transparency.

Step (b)

The mixed solution prepared in the step (a) was treated by heating at 90° C. for 5 hours with stirring, to obtain 13834 g of a stannic oxide—zirconium oxide complex sol. The sol had 2.96% by weight of $SnO_2$, 0.44% by weight of $ZrO_2$, 3.40% by weight of $SnO_2+ZrO_2$, pH of 1.45, a particle diameter of 9.0 nm, colloidal color and good transparency.

Step (c)

187.2 g of No. 3 sodium silicate (containing 29.0% by weight of $SiO_2$) was dissolved in 2101.1 g of water, into which 28.0 g of sodium tungstate $Na_2WO_4.2H_2O$ (containing 71% by weight of $WO_3$) and 35.7 g of sodium stannate $NaSnO_3.H_2O$ (containing 55% by weight of $SnO_2$) were then dissolved. Then, the solution was passed through a column of a hydrogen type cation exchange resin, to obtain 3203.6 g of an acidic tungsten oxide—stannic oxide—silicon dioxide complex sol (pH of 2.3, containing 0.62% by weight of $WO_3$, 0.62% by weight of $SnO_2$ and 1.69% by weight of $SiO_2$, and having a $WO_3/SnO_2$ weight ratio of 1.0, a $SiO_2/SnO_2$ weight ratio of 2.7 and a particle diameter of 2.1 nm).

Step (d)

To 3203 g of the tungsten oxide—stannic oxide—silicon dioxide complex sol (containing 94.1 g of $WO_3+SnO_2+SiO_2$) prepared in the step (c), 13834 g (containing 470.3 g of $ZrO_2+SnO_2$) of a stannic oxide—zirconium oxide complex sol prepared in the step (b) was added over 20 minutes at room temperature and continued to stir for 30 minutes. In the obtained mixed solution, a ratio of tungsten oxide—stannic oxide—silicon dioxide complex colloid ($WO_3+SnO_2+SiO_2$) to stannic oxide—zirconium oxide complex colloid ($ZrO_2+SnO_2$) was a ($WO_3+SnO_2+SiO_2$)/($ZrO_2+SnO_2$) weight ratio of 0.20, pH was 1.55, and an amount of the total metal oxides were 3.32% by weight, and the solution exhibited a tendency of cloudiness due to micro-aggregation of colloidal particles.

Step (e)

To 17037 g of the mixed solution obtained in the step (d), 11.3 g of diisobutylamine was added dropwise and then passed through a column filled with a hydroxide group type anion exchange resin (Amberlite 410) at room temperature, then heated and aged at 80° C. for 1 hour, to obtain 19970 g of a modified aqueous stannic oxide—zirconium oxide complex sol (diluted solution). The sol had 2.83% by weight of total metal oxides, pH of 10.25, colloidal color and good transparency.

The modified aqueous stannic oxide—zirconium oxide complex sol (diluted solution) obtained in the step (e) was concentrated by means of a filtering device fitted with an ultrafiltration membrane having about 50,000-molecular-weight cutoff at room temperature, to obtain 3402.3 g of a highly concentrated modified aqueous stannic oxide—zirconium oxide complex sol. The sol had pH of 8.31 and 20.0% by weight of total metal oxides ($ZrO_2+SnO_2+WO_3+SiO_2$), and it was stable.

To 3402.3 g of the above-mentioned highly concentrated modified aqueous stannic oxide—zirconium oxide complex sol, 7.9 g of tartaric acid, 11.9 g of diisobutylamine and one drop of a defoamer (SN defoamer 483 made by Sannopco Co.) were added and stirred for 1 hour at room temperature. The sol was distilled off water by adding 30 liter of methanol little by little under a decreased pressure and at a solution temperature of 30° C. or lower in a rotary evaporator, to obtain 1397.7 g of a modified methanolic stannic oxide—zirconium oxide complex sol wherein water of the aqueous sol was substituted with methanol. The sol had a specific gravity of 1.140, pH of 7.23 (an equal weight mixture with water), a viscosity of 2.3 mPa.s, 34.0% by weight of total metal oxides ($ZrO_2+SnO_2+WO_3+SiO_2$), a water content of 0.50% by weight and a particle diameter by an electron-microscopic observation of 10–15 nm.

The sol had colloidal color and high transparency, and it was stable after 3 months at room temperature without any abnormality such as formation of precipitation, cloudiness and increase in viscosity. Further, a refractive index of the dried version of sol was 1.75.

Example 3

Step (a)

To 3043 g of an aqueous zirconium oxychloride solution (containing 60.87 g of $ZrO_2$, 2.0% by weight of $ZrO_2$) prepared by dissolving a reagent, zirconium oxychloride ($ZrOCl_2.8H_2O$), into water, 10791 g of the alkaline aqueous stannic oxide sol as prepared above (409.5 g of $SnO_2$) was added with stirring at room temperature and continued to stir for 2 hours. The mixed solution was a sol having a $ZrO_2/SnO_2$ weight ratio of 0.15, pH of 1.50, colloidal color and good transparency.

Step (b)

The mixed solution prepared in the step (a) was treated by heating at 90° C. for 5 hours with stirring, to obtain 13834 g of a stannic oxide—zirconium oxide complex sol. The sol had 2.96% by weight of $SnO_2$, 0.44% by weight of $ZrO_2$, 3.40% by weight of $SnO_2+ZrO_2$, pH of 1.45, a particle diameter of 9.0 nm, colloidal color and good transparency.

Step (c)

74.8 g of No. 3 sodium silicate (containing 29.0% by weight of $SiO_2$) was dissolved in 2497.0 g of water, into which 51.0 g of sodium tungstate $Na_2WO_4.2H_2O$ (containing 71% by weight of $WO_3$) and 65.8 g of sodium stannate $NaSnO_3.3H_2O$ (containing 55% by weight of $SnO_2$) were then dissolved. Then, the solution was passed through a column of a hydrogen type cation exchange resin, to obtain 3246.0 g of an acidic tungsten oxide—stannic oxide—silicon dioxide complex sol (pH of 2.0, containing 1.11% by weight of $WO_3$, 1.11% by weight of $SnO_2$ and 0.67% by weight of $SiO_2$, and having a $WO_3/SnO_2$ weight ratio of 1.0, a $SiO_2/SnO_2$ weight ratio of 0.60 and a particle diameter of 3.0 nm).

Step (d)

To 3246.0 g of the tungsten oxide—stannic oxide—silicon dioxide complex sol (containing 94.1 g of $WO_3+SnO_2+SiO_2$) prepared in the step (c), 13834 g (containing 470.4 g of $ZrO_2+SnO_2$) of a stannic oxide—zirconium oxide complex sol was added over 20 minutes and continued to stir for 30 minutes at room temperature. In the obtained mixed solution, a ratio of tungsten oxide—stannic oxide—silicon dioxide complex colloid ($WO_3+SnO_2+SiO_2$) to stannic oxide—zirconium oxide complex colloid ($ZrO_2+SnO_2$) was a ($WO_3+SnO_2+SiO_2$)/($ZrO_2+SnO_2$) weight ratio of 0.20, pH was 1.87, an amount of the total metal oxides was 3.31% by weight, and the solution exhibited a tendency of cloudiness due to micro-aggregation of colloidal particles.

Step (e)

17080 g of the mixed solution obtained in the step (d) was passed through a column filled with a hydroxide group type anion exchange resin (Amberlite IRA-410) at room temperature, to obtain 22204.0 g of a modified aqueous stannic oxide—zirconium oxide complex sol (diluted solution). The sol had 2.54% by weight of total metal oxides, pH of 10.67, colloidal color and good transparency.

The modified aqueous stannic oxide—zirconium oxide complex sol (diluted solution) obtained in the step (e) was concentrated by means of a filtering device fitted with an ultrafiltration membrane having about 50,000-molecular-weight cutoff at room temperature, to obtain 2675.4 g of a highly concentrated modified aqueous stannic oxide—zirconium oxide complex sol. The sol had pH of 9.74 and 21.1% by weight of total metal oxides ($ZrO_2+SnO_2+WO_3+SiO_2$), and it was stable.

To 2675.4 g of the above-mentioned highly concentrated modified aqueous stannic oxide—zirconium oxide complex sol, 11.30 g of tartaric acid, 16.9 g of diisobutylamine and one drop of a defoamer (SN defoamer 483 made by Sannopco Co.) were added and stirred for 1 hour at room temperature. The sol was distilled off water by adding 28 liter of methanol little by little at a reduced pressure and a solution temperature of 30° C. or lower in a rotary evaporator, to obtain 1850 g of a modified methanolic stannic oxide—zirconium oxide complex sol wherein water of the aqueous sol was substituted with methanol. The sol had a specific gravity of 1.114, pH of 7.12 (an equal weight mixture with water), a viscosity of 2.0 mPa.s, 30.2% by weight of total metaloxides ($ZrO_2+SnO_2+WO_3+SiO_2$), a water content of 0.55% by weight and a particle diameter by an electron-microscopic observation of 10–15 nm.

The sol had colloidal color and high transparency, and it was stable after 3 months at room temperature without any abnormality such as formation of precipitation, cloudiness and increase in viscosity. Further, a refractive index of the dried version of sol was 1.77.

Example 4

Step (a)

To 3043 g of an aqueous zirconium oxychloride solution (containing 60.87 g of $ZrO_2$, 2.0% by weight of $ZrO_2$) prepared by dissolving a reagent, zirconium oxychloride ($ZrOCl_2.8H_2O$), into water, 10791 g of the alkaline aqueous stannic oxide sol as prepared above (409.5 g of $SnO_2$) was added with stirring at room temperature and continued to stir for 2 hours. The mixed solution was a sol having a $ZrO_2$/$SnO_2$ weight ratio of 0.15, pH of 1.50, colloidal color and good transparency.

Step (b)

The mixed solution prepared in the step (a) was treated by heating at 90° C. for 5 hours with stirring, to obtain 13834 g of a stannic oxide—zirconium oxide complex sol. The sol had 2.96% by weight of $SnO_2$, 0.44% by weight of $ZrO_2$, 3.40% by weight of $SnO_2+ZrO_2$, pH of 1.45, a particle diameter of 9.0 nm, colloidal color and good transparency.

Step (c)

Prepared similarly to the step (c) in Example 1.

Step (d)

To 1880 g of the tungsten oxide—stannic oxide—silicon dioxide complex sol (containing 47.0 g of $WO_3+SnO_2+SiO_2$) prepared in the step (c), 13834 g (containing 470.4 g of $ZrO_2+SnO_2$) of a stannic oxide—zirconium oxide complex sol was added over 20 minutes and continued to stir for 30 minutes at room temperature. In the obtained mixed solution, a ratio of tungsten oxide—stannic oxide—silicon dioxide complex colloid ($WO_3+SnO_2+SiO_2$) to stannic oxide—zirconium oxide complex colloid ($ZrO_2+SnO_2$) was a ($WO_3+SnO_2+SiO_2$)/($ZrO_2+SnO_2$) weight ratio of 0.10, pH was 1.57, and an amount of the total metal oxides was 3.30% by weight, and the solution exhibited a tendency of cloudiness due to micro-aggregation of colloidal particles.

Step (e)

To 15714 g of the mixed solution obtained in the step (d), 10.3 g of diisobutylamine was added and then passed through a column filled with a hydroxide group type anion exchange resin (Amberlite 410) at room temperature, then heated and aged at 80° C. for 1 hour, to obtain 19163 g of a modified aqueous stannic oxide—zirconium oxide complex sol (diluted solution). The sol had 2.7% by weight of total metal oxides, pH of 10.56, colloidal color and good transparency.

The modified aqueous stannic oxide—zirconium oxide complex sol (diluted solution) obtained in the step (e) was concentrated by means of a filtering device fitted with an ultrafiltration membrane having about 50,000-molecular-weight cutoff at room temperature, to obtain 3423 g of a highly concentrated modified aqueous stannic oxide—zirconium oxide complex sol. The sol had pH of 9.22 and 14.6% by weight of total metal oxides ($ZrO_2+SnO_2+WO_3+SiO_2$), and it was stable.

To 2370 g of the above-mentioned highly concentrated modified aqueous stannic oxide—zirconium oxide complex sol, 7.7 g of tartaric acid, 11.6 g of diisobutylamine and one drop of a defoamer (SN defoamer 483 made by Sannopco Co.) were added and stirred for 1 hour at room temperature.

The sol was distilled off water by adding 29 liter of methanol little by little under a decreased pressure and at a solution temperature of 30° C. or lower in a rotary evaporator, to obtain 1505 g of a modified methanolic stannic oxide—zirconium oxide complex sol wherein water of the aqueous sol was substituted with methanol. The sol had a specific gravity of 1.086, pH of 7.86 (an equal weight mixture with water), a viscosity of 5.3 mPa.s, 30.9% by weight of total metal oxides ($ZrO_2+SnO_2+WO_3+SiO_2$), a water content of 0.51% by weight and a particle diameter by an electron-microscopic observation of 10–15 nm.

The sol had colloidal color and high transparency, and it was stable after 3 months at room temperature without any abnormality such as formation of precipitation, cloudiness and increase in viscosity. Further, a refractive index of the dried version of sol was 1.76.

Comparative Example 1

A modified stannic oxide methanol sol (containing 30.0% by weight of $SnO_2+WO_3$) having a particle diameter of 9.0 nm which was formed by coating colloidal particles of stannic oxide prepared as above (a spindle-form colloidal diameter of 10 nm or less, a specific surface area by a BET method of 120 $m^2$/g, and a particle diameter, calculated from the specific surface are, of 7.2 nm) as nuclei at their surfaces with colloidal particles of a tungsten oxide—stannic oxide complex having a $WO_3$/$SnO_2$ weight ratio of 0.5–100 and a particle diameter of 1.8 nm was used.

Comparative Example 2

A modified methanolic stannic oxide—zirconium oxide sol (containing 30.0% by weight of $SnO_2+ZrO_2+WO_3$) having a particle diameter of 10.2 nm which was formed by coating colloidal particles of stannic oxide—zirconium oxide complex having a bonded structure of stannic oxide colloidal particles and zirconium oxide colloidal particles at a $ZrO_2$/$SnO_2$ ratio of 0.15 based on weights of these oxides and a particle diameter of 9.0 nm as nuclei at their surfaces with colloidal particles of tungsten oxide—stannic oxide complex having a $WO_3$/$SnO_2$ weight ratio of 1.0 nm and a particle diameter of 1.2 nm was used.

(Preparation of Coating Solution)

To 105.3 parts by weight of γ-glycidoxypropyltrimethoxy-silane, 36.8 parts by weight of 0.01N hydrochloric acid was added dropwise and thereafter stirred for 24 hours, to prepare a hydrolysate of γ-glycidoxypropyltrimethoxysilane. To this, 192.3 parts by weight of the modified metal oxide sols in Examples 1–2 and Comparative Examples 1–2 respectively were added, to prepare four coating solutions.

(Preparation of Hardened Coating)

A commercially available polycarbonate plate having a refractive index nD=1.59 was prepared, to which a coating composition was coated by dip coating and treated by heating at 120° C. for 2 hours, to harden the coating.

Thereafter, it was dipped in hot water at 60° C. for 1 hour, removed with moisture wiped off sufficiently, and rubbed for several times with steel wool. The state of the coating was observed visually and evaluated by the following three ranks; without damage (○), moderately damaged (Δ), and easily damaged (X).

TABLE 1

| Examples | moisture resistance (water resistance) |
| --- | --- |
| Example 1 | ◯ |
| Example 2 | ◯ |
| Example 3 | ◯ |
| Example 4 | ◯ |
| Comparative Example 1 | × |
| Comparative Example 2 | Δ |

In evaluation of water resistance, it is clear that the modified stannic oxide—zirconium oxide complex sol shown in Comparative Example 2 is more preferable than the modified stannic oxide sol shown in Comparative Example 1 and that the modified stannic oxide—zirconium oxides by coating with colloidal particles of tungsten oxide—stannic oxide—silicon dioxide shown in Examples 1–2 are favorable.

Effects of the Invention

The sol obtained according to the present invention of stannic oxide—zirconium oxide complex colloidal particles modified at their surfaces with tungsten oxide—stannic oxide—silicon dioxide complex colloidal particles is colorless and transparent, and the dried coating thereof exhibits a refractive index of about 1.7–1.8 and has high bonding strength and hardness as well as good light resistance, anti-static property, heat resistance, wear resistance, etc. Further, water resistance and moisture resistance are improved eminently compared with conventional ones. It is supposed that water resistance and moisture resistance are improved due to siloxane bonding formation during dry coating by silicon dioxide component in tungsten oxide—stannic oxide—silicon dioxide complex colloidal particles.

The sol is stable at pH of about 1–9, so that it can provide sufficient stability to be supplied as an industrial material.

The sol had good compatibility with a sol comprising other negatively charged colloidal particles, since colloidal particles thereof are negatively charged, thus it can be mixed stably with a dispersion such as silica sol, an diantimony pentaoxide sol, anionic or nonionic surfactants, an aqueous polyvinyl alcohol solution, etc., anionic or nonionic resinous emulsions, water glass, an aluminum phosphate solution, etc., a hydrolysate solution of ethyl silicate and a hydrolysate solution of silane coupling agent.

The sol according to the present invention having such properties are effective particularly as a component to improve a refractive index, dyeability, chemical resistance, water resistance, moisture resistance, light resistance, weather resistance, wear resistance, etc. for forming a hard coating on a plastic lens, and it can be used for other various applications.

By applying the sol on surfaces of organic fibers, fibrous products, paper, etc., flame retardant property, surface slide inhibiting property, anti-static property, dyeability, etc. of these materials can be improved. Further, the sol can be used as a binder for ceramic fibers, glass fibers, ceramics, etc.

Further, by using with mixture into various paints, various adhesives, etc., water resistance, chemical resistance, light resistance, weather resistance, flame retardant property, etc. can be improved. Still further, the sol can be generally used as a surface treating agent for metallic materials, ceramic materials, glass materials, plastic materials, etc., Further, it is useful as a catalytic component.

What is claimed is:

1. A stable sol which comprises modified colloidal particles of a stannic oxide—zirconium oxide complex having a particle diameter of 4.5–60 nm, wherein the particles are formed by coating complex colloidal particles of stannic oxide—zirconium oxide having a bonded structure of stannic oxide colloidal particles and zirconium oxide colloidal particles at a $ZrO_2/SnO_2$ ratio of 0.02–1.0 based on weights of these oxides and having a particle diameter of 4–50 nm as nuclei, with colloidal particles of a tungsten oxide—stannic oxide—silicon dioxide complex having a $WO_3/SnO_2$ weight ratio of 0.1–100, a $SiO_2/SnO_2$ weight ratio of 0.1–100, and having a particle diameter of 2–7 nm, and wherein the sol contains 2–50% by weight of total metal oxides.

2. A method for preparing a stable sol of modified stannic oxide—zirconium oxide complex colloidal particles according to claim 1, comprising the steps of:

(a) mixing an aqueous sol of stannic oxide which contains colloidal particles having a particle diameter of 4–50 nm at a concentration of 0.5–50% by weight calculated as $SnO_2$, with an aqueous solution of oxyzirconium salt having a concentration of 0.5–50% by weight calculated as $ZrO_2$, at a weight ratio of $ZrO_2/SnO_2$ of 0.02–1.0;

(b) of forming an aqueous sol of a stannic oxide—zirconium oxide complex having a particle diameter of 4–50 nm by heating the mixed solution obtained in the step (a) at 60–200° C. for 0.1–50 hours;

(c) of forming a sol of a tungsten oxide—stannic oxide—silicon dioxide complex by preparing an aqueous solution containing tungstate, stannate and silicate in a $WO_3/SnO_2$ weight ratio of 0.1–100 and a $SiO_2/SnO_2$ weight ratio of 0.1–100 and removing cations present in the solution;

(d) of mixing 100 parts by weight, calculated as the total of $ZrO_2$ and $SnO_2$ contained, of the aqueous stannic oxide—zirconium oxide complex sol obtained in the step (b) with 2–100 parts by weight, calculated as total of $WO_3$, $SnO_2$ and $SiO_2$ contained, of the tungsten oxide—stannic oxide—silicon dioxide complex sol obtained in the step (c) having a particle diameter of 2–7 nm, a $WO_3/SnO_2$ weight ratio of 0.1–100 and a $SiO_2/SnO_2$ weight ratio of 0.1–100 at 0–100° C.; and (e) of removing anions present in the aqueous modified stannic oxide—zirconium oxide complex sol obtained in the step (d) by bringing the sol into contact with an anion exchanger.

\* \* \* \* \*